United States Patent
DeDe et al.

(10) Patent No.: US 8,631,637 B2
(45) Date of Patent: Jan. 21, 2014

(54) AUXILIARY POWER UNIT FIRE ENCLOSURE

(75) Inventors: Brian C. DeDe, San Diego, CA (US); David Eugene Martinez, Temecula, CA (US); David Lau, San Diego, CA (US); Mark C. Tate, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 690 days.

(21) Appl. No.: 12/847,302

(22) Filed: Jul. 30, 2010

(65) Prior Publication Data

US 2012/0023889 A1    Feb. 2, 2012

(51) Int. Cl.
 *F02G 3/00* (2006.01)
 *F02C 7/268* (2006.01)
 *F02C 6/00* (2006.01)
 *B64D 41/00* (2006.01)

(52) U.S. Cl.
 USPC ............ 60/39.091; 60/787; 60/39.15; 244/56

(58) Field of Classification Search
 USPC ........... 60/796, 797, 801, 802, 785, 804, 752, 60/754–758, 760, 798–800, 787, 39.15; 244/54, 58
 See application file for complete search history.

(56) References Cited

U.S. PATENT DOCUMENTS

| | | | |
|---|---|---|---|
| 2,943,449 A * | 7/1960 | Kurti | 60/799 |
| 5,398,496 A * | 3/1995 | Taylor et al. | 60/796 |
| 5,996,938 A | 12/1999 | Simonetti | |
| 6,244,034 B1 | 6/2001 | Taylor et al. | |
| 6,308,915 B1 | 10/2001 | Liston et al. | |
| 6,942,181 B2 * | 9/2005 | Dionne | 244/57 |
| 7,089,748 B2 * | 8/2006 | Tiemann | 60/800 |
| 7,093,447 B2 | 8/2006 | Thompson et al. | |
| 7,093,666 B2 | 8/2006 | Trumper | |
| 7,232,097 B2 | 6/2007 | Noiseux et al. | |
| 7,337,605 B2 | 3/2008 | Hagshenas | |
| 7,526,921 B2 | 5/2009 | Williams et al. | |
| 2006/0032974 A1 * | 2/2006 | Williams | 244/58 |
| 2008/0099611 A1 | 5/2008 | Gonzalez et al. | |
| 2009/0191047 A1 | 7/2009 | Schlinker et al. | |
| 2010/0307166 A1 * | 12/2010 | Woodcock et al. | 60/796 |

* cited by examiner

Primary Examiner — William H Rodriguez
Assistant Examiner — William Breazeal
(74) Attorney, Agent, or Firm — Kinney & Lange, P.A.

(57) ABSTRACT

A fire enclosure for an auxiliary power unit having a hot zone formed by a gas turbine comprises an annular fire enclosure body, an axial expansion joint and a radial expansion joint. The annular fire enclosure body is configured to encapsulate the hot zone. The fire enclosure includes a first end and a second end. The axial expansion joint is connected to the first end. The radial expansion joint is connected to the second end.

14 Claims, 2 Drawing Sheets

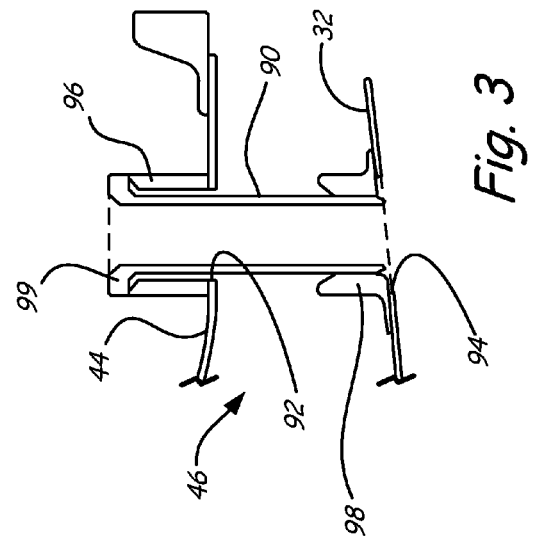
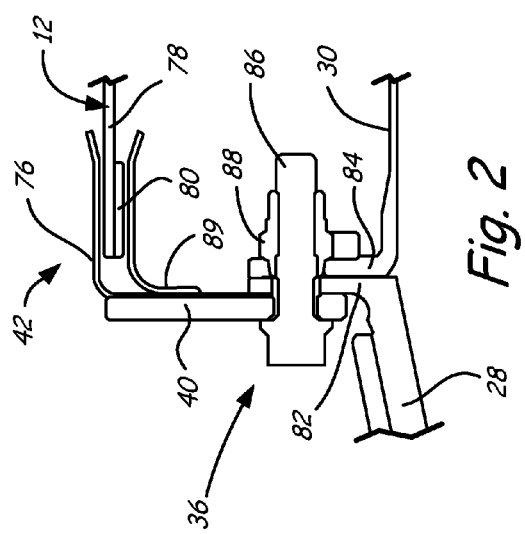

AUXILIARY POWER UNIT FIRE ENCLOSURE

STATEMENT OF GOVERNMENT INTEREST

The U.S. Government has a paid-up license in this invention and the right in limited circumstances to require the patent owner to license others on reasonable terms as provided for by the terms of Contract No. N00019-06-0081 and Sub-Contract No. 4500019224 awarded by the United States Navy.

BACKGROUND

The present invention is directed to auxiliary power units having fire enclosures. More particularly, the invention relates to connecting joints for mounting fire enclosures to the auxiliary power unit.

Auxiliary power units (APUs) comprise gas turbine engines that operate to provide various power inputs to aircraft, such as helicopters, when the main propulsion engines are not operating, such as during ground operations or during the event of an outage during flight. APUs can additionally provide supplemental power to that generated during main engine operations. APUs typically comprise gas turbine engines having a compressor and a turbine, between which a combustor burns fuel. Through a gearbox, the turbine provides mechanical input to an electrical generator, while compressed air bled from the compressor is used to supply various environmental control systems.

APUs are typically located within the outer skin of the fuselage of the aircraft. Thus, it is desirable to encapsulate hot sections of the APU to provide a fire break where fuel is present. Conventional practice, such as is described in U.S. Pat. No. 7,526,921 to Williams et al., involves rigidly bolting a fire enclosure to various fixed positions on the APU. Temperature variations that arise during different operating cycles of the APU produce thermal expansions of various APU components that alter the distances between the fixed positions. Thermal growth of the APU thus induces strain into the fire enclosure. The ability of the fire enclosure to tolerate deflection or bending is limited because the fire enclosure is not a structural component designed to absorb loading. There is, therefore, a need for alleviating strain in APU fire enclosures.

SUMMARY

The present invention is directed to a fire enclosure for an auxiliary power unit having a hot zone formed by a gas turbine. The fire enclosure comprises an annular fire enclosure body, an axial expansion joint and a radial expansion joint. The annular fire enclosure body is configured to encapsulate the hot zone. The fire enclosure includes a first end and a second end. The axial expansion joint is connected to the first end. The radial expansion joint is connected to the second end.

BRIEF DESCRIPTION OF THE DRAWINGS

FIG. 2 shows the axial expansion joint of FIG. 1 connecting the fire enclosure to an engine case.

FIG. 3 shows the radial expansion joint of FIG. 1 connecting the fire enclosure to an exhaust case.

DETAILED DESCRIPTION

Figure 1:
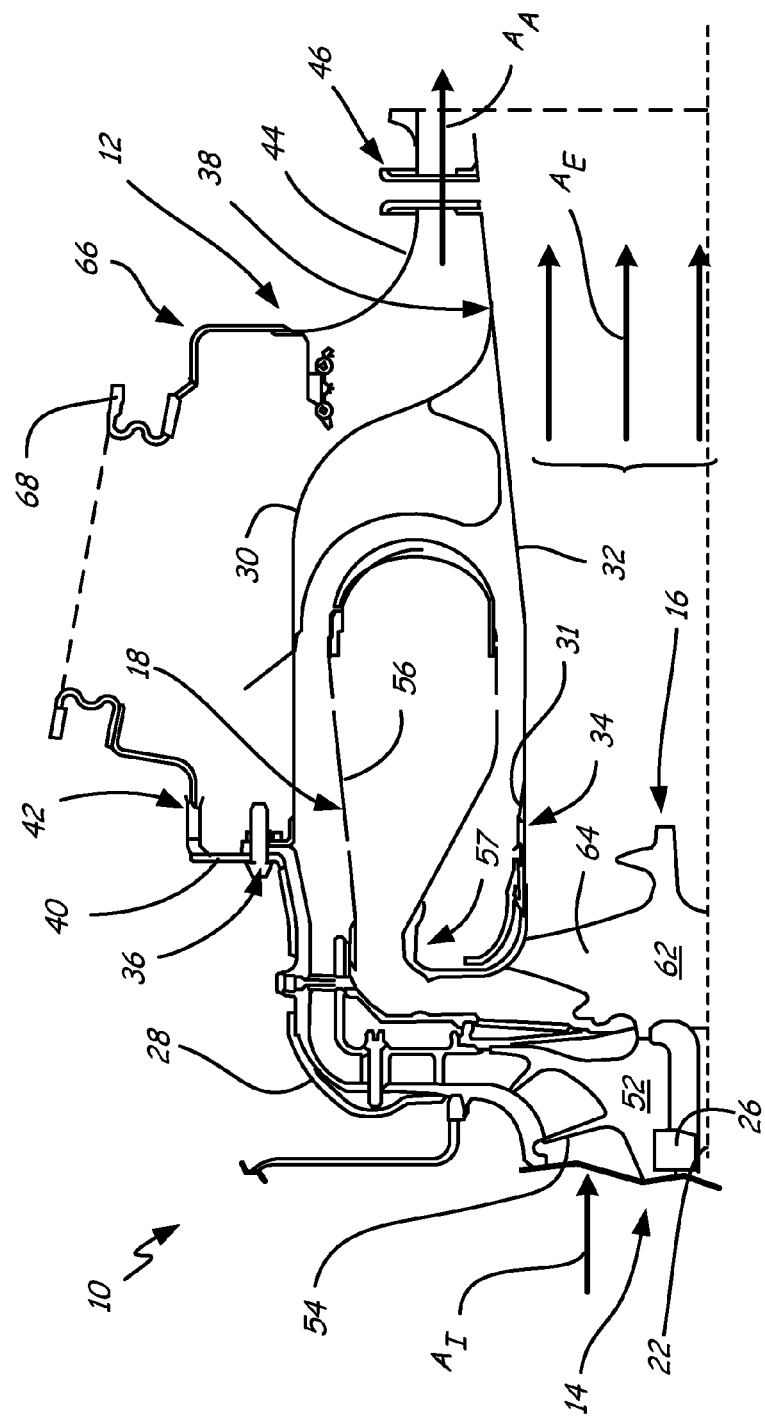
FIG. 1 is a partial cross-sectional view of a fire enclosure of an auxiliary power unit having an axial expansion joint and a radial expansion joint.

FIG. 1 is a cross-sectional view of auxiliary power unit (APU) 10 having fire enclosure 12 of the present invention. APU 10 includes compressor section 14, turbine section 16 and combustor section 18. Compressor section 14, turbine section 16 and combustor section 18 comprise a gas turbine engine that may operate to provide mechanical input via shaft 22 to various components, such as an electrical generator (not depicted). Shaft 22 passes through compressor section 14, which is supported by bearings 26, and connects to turbine section 16. The gas turbine engine of compressor section 14, turbine section 16 and combustor section 18 is disposed within compressor case 28, combustor case 30, turbine case 31 and exhaust case 32. Compressor case 28, combustor case 30, turbine case 31 and exhaust case 32 form a serpentine flow path for air and gas that passes through the gas turbine engine. Fire enclosure 12 provides a containment shield for containing heat generated by combustor section 18 of the gas turbine engine and for containing flames generated by fuel vapors which come into contact with the outside of combustor case 30.

Fire enclosure 12 and the other engine casing components are connected by a plurality of joints that provide structural integrity to APU 10, while also permitting some of the cases to translate to absorb stresses generated during operation of APU 10. Exhaust case 32 connects with turbine case 31 at first joint 34. Compressor case 28 connects with combustor case 30 at second joint 36. Combustor case 30 connects with exhaust case 32 at third joint 38. Fire enclosure 12 connects with compressor case 28 through forward support ring 40 and fourth joint 42. Exhaust case 32 connects with fire enclosure 12 through aft support ring 44 and fifth joint 46. Fourth joint 42 and fifth joint 46 comprise expansion joints that permit fire enclosure 12 to deflect, deform or otherwise absorb thermal stresses generated by the operation of APU 10. Fire enclosure 12 provides a fire wall or fire break between the hot section of APU 10 and the surrounding environment.

Compressor case 28 comprises an annular body for housing compressor wheel 52 and compressor blades 54. Compressor case 28 has a converging inlet between outer and inner walls that comprise a passageway for conducting inlet air $A_I$ through compressor section 14. Combustor case 30 comprises a single walled annular body having a generally cylindrical side-wall portion and a radially converging end portion that houses combustor liner 56. The side-wall portion generally traverses the axial length of combustor liner 56, while the radially converging portion generally traverses the radial extent of combustor liner 56. Combustor case 30 directs airflow from compressor case 28 into combustor liner 56.

Turbine case 31 comprises an annular body for housing turbine wheel 62. Turbine case 31 has a diverging inlet between outer and inner walls that comprise a passageway for conducting compressed inlet air $A_I$ through turbine section 16. Turbine case 31 connects to the outlet of combustor liner 56 such that combustor liner 56 is encapsulated between compressor case 28, combustor case 30, turbine case 31 and exhaust case 32. Turbine case 31 directs airflow from combustor section 18 to exhaust case 32. Exhaust case 32 comprises a cylindrical body having a generally straight upstream section and a slightly diverging downstream section. Exhaust case 32 extends into combustor section 18 and traverses the axial length of combustor liner 56. Exhaust case 32 directs exhaust air $A_E$ from turbine section 16 out of APU 10.

Fire enclosure 12 is jointed to APU 10 radially outward of combustor case 30. Fire enclosure 12 comprises a generally annular or cylindrical body that includes various shapes to facilitate joining to forward support ring 40 and aft support ring 44 and to accommodate incorporation of other features, such as eductor inlet 66, which includes E-Seal 68, and drain assembly 70. Forward support ring 40 is joined to fire enclosure 12 through fourth joint 42, which, as is discussed in detail with respect to FIG. 3, comprises an axial expansion joint. Aft support ring 44 is joined to fire enclosure 12 through sixth joint 48, which, in the embodiment shown, comprises a bolted connection using a threaded fastener, although other connections may be used. Aft support ring 44 is joined to exhaust case 32 through fifth joint 46, which, as is discussed in detail with respect to FIG. 4, comprises a radial expansion joint.

In various embodiments, compressor case 28 and turbine case 31 comprise bodies that have been manufactured, i.e. cast and machined. In various embodiments, combustor case 30 and exhaust case 32 comprise thin sheet-like bodies that have been shaped and formed. Compressor case 28, turbine case 31, combustor case 30 and exhaust case 32 are formed of various metal alloys, such as stainless steel, aluminum or titanium Likewise, forward support ring 40 and aft support ring 44 are formed of various metals, such as stainless steel sheet metal. Fire enclosure 12 comprises a thin sheet-like structure that is shaped and formed. In various embodiments, fire enclosure 12 is also made from various metal alloys as previously listed. However, in order to reduce the weight of APU 10, fire enclosure 12 is made from composite materials, such as a carbon fiber or fiber reinforced plastic composite, in other embodiments.

Inlet air $A_I$ is drawn into APU 10 by operation of compressor section 14. Inlet air $A_I$ continues through compressor section 14 to combustor case 30. Inside combustor case 30, compressed inlet air $A_I$ enters combustor liner 56, which is connected to the inlet of turbine case 31 at seventh joint 57. Fuel is injected into liner 56 through fuel nozzles (not shown) and ignited by an igniter (not shown) to carry out a combustion process to generate high energy gases for turbine section 16. The high energy gases flow to turbine section 16 where they are expanded and useful work is extracted by turbine section 16.

Compressor section 14 and turbine section 16 are co-axially connected by shaft 22. As exhaust air $A_E$ passes through turbine section 16, turbine wheel 62 rotates shaft 22 through blades 64. Compressor wheel 52 is also coupled to turbine wheel 62 such that compressor blades 54 rotate to provide compressed air to combustor section 18 for carrying out the combustion process in combination with the fuel provided by the fuel nozzles. Shaft 22 extends from turbine wheel 62, through compressor wheel 52 and bearings 26.

Operation of combustor section 18 produces heat. Temperatures within combustor section 18 far exceed approximately 1,000 degrees Fahrenheit (~538° Celsius). Temperatures outside of combustor liner 56 reach well above approximately 400 degrees Fahrenheit (~204° Celsius) due to combustor section 18 and temperatures generated by compression of air in compress section 14. Combustor section 18, therefore, comprises a hot zone within APU 10 where temperatures are above the flash point of fuel used in combustor section 18. In order to reduce the potential for hazard, the hot zone is encapsulated within fire enclosure 12. In particular, fire enclosure 12, fourth joint 42 and fifth joint 46 prevent escape of fire from within combustor section 18, while permitting fire enclosure 12 to deflect and translate within APU 10.

Fire enclosure 12, compressor case 28, combustor case 30, exhaust case 32, forward support ring 40 and aft support ring 44 are joined by first joint 34 through fifth joint 46. Compressor case 28, combustor case 30 and exhaust case 32 form a flow path for inlet air $A_I$ and exhaust air $A_E$. Second joint 36 and third joint 38 comprise rigid joints that provide stationary connection points for compressor case 28, combustor case 30 and exhaust case 32. Fire enclosure 12, forward support ring 40 and aft support ring 44 form a flow path into which ambient air $A_A$ flows. Ambient air $A_A$ enters fire enclosure 12 through eductor inlet 66, which includes E-seal 68. Fire enclosure 12 is supported by expansion joints comprising fourth joint 42 and fifth joint 46.

The combustion of air and fuel within combustor liner 56 and compression of air within compressor section 14 builds up heat and produces flames within APU 10. The flames are contained by combustor case 30 and exhaust case 32 while the heat can conduct through combustor case 30 and exhaust case 32. Due to the close proximity to liner 56 and heat generated by compressed air flow, combustor case 30 does not keep the temperatures outside of APU 10 below the flashpoint of fuel used in combustor section 18. Fire enclosure 12 provides a layer of containment to flames generated by fuel vapors which contact the exterior surface of combustor case 30 or exhaust case 32 and heat to ensure safe operation of APU 10 under all conditions. In particular, fire enclosure 12 provides a flame-proof heat zone within APU 10 to prevent the spread of heat and flames. Fire enclosure 12 is supported within APU 10 by connection to compressor case 28, combustor case 30 and exhaust case 32, which, along with forward support ring 40 and aft support ring 44, provide structural stability to fire enclosure 12.

E-seal 68 of eductor inlet 66 connects to a duct within the aircraft to which APU 10 is mounted. The duct extends to an inlet opening within the aircraft skin to allow ambient air $A_A$ into fire enclosure 12. Exhaust air $A_E$ draws ambient air $A_A$ through fire enclosure 12. Within APU 10, ambient air $A_A$ cools combustor case 30. Ambient air $A_A$ also cools the exhaust plume produced by exhaust air $A_E$ outside of APU 10.

Compressor case 28, combustor case 30, exhaust case 32 and combustor liner 56 are attached within APU 10 at first joint 34, second joint 36, third joint 38 and seventh joint 57. First joint 34 comprises an axial expansion joint between exhaust case 32 and combustor case 30. Seventh joint 57 comprises an axial expansion joint between turbine case 31 and combustor liner 56. In one embodiment, first joint 34 and seventh joint 57 comprise tongue and groove or bird-mouth seal joints. Second joint 36 comprises a rigid connection between radially outward facing flanges on compressor case 28 and combustor case 30. For example, a plurality of spaced-apart threaded fasteners are inserted through openings within the flanges and secured with nuts or any other suitable means. Third joint 38 comprises a fixed connection between adjacent flat segments of combustor case 30 and exhaust case 32. For example, a weld or braze seam is positioned along the flat segments around the entire circumference of exhaust case 32. Second joint 36 and third joint 38, therefore, comprises fixed points within APU 10.

Heat within APU 10 causes compressor case 28, combustor case 30 and exhaust case 32 to expand during operation. Expansion of theses cases causes the fixed position of second joint 36 and third joint 38 to change relative position within APU 10. For example, the radial distance between third joint 38 and second joint 36 increases as combustor case 30 expands. Likewise, for example, the axial distance between second joint 36 and third joint 38 increases as exhaust case 32 expands. The shape of fire enclosure 12 is distorted by displacement of combustor case 30 and exhaust case 32. Additionally, cooling provided by ambient air $A_A$ from eductor inlet 66 produces a temperature gradient across fire enclosure 12 that further contributes to distortion of the shape of fire enclosure 12. Furthermore, ambient air $A_A$ from eductor inlet 66 reduces the temperatures to which fire enclosure 12 is exposed such that materials having lower threshold limits to heat can be used. Fire enclosure 12 is, in various embodiments, comprised of a composite material that has lower coefficient of thermal expansion than the metals comprising combustor case 30 and exhaust case 32 and, as such, does not expand commensurately with such components. Thus, thin construction and different thermal expansion rates reduce the ability of fire enclosure 12 to withstand thermal and mechanical stresses.

Fourth joint 42 and fifth joint 46 provide degrees of freedom for movement of fire enclosure 12. Particularly, fourth joint 42 comprises an axial expansion joint to provide freedom of movement of fire enclosure 12 in the axial direction, and fifth joint 46 comprises a radial expansion joint to provide freedom of movement of fire enclosure 12 in the radial direction. The ability of fourth joint 42 and fifth joint 46 to absorb displacement of combustor case 30 and exhaust case 32 reduces the strain induced in fire enclosure 12 and preserves the stability of fire enclosure 12. This helps permit fire enclosure 12 to be made from lighter and more brittle material.

FIG. 2 shows fourth joint 42 of FIG. 1 comprising an axial expansion joint. Fourth joint 42 includes slot 76, flange 78 and pad 80. Fourth joint 42 connects fire enclosure 12 to compressor case 28 using forward support ring 40. Compressor case 28 and combustor case 30 include radially outward facing flanges 82 and 84 having bores through which fastener 86 extends. Fastener 86, which comprises a threaded bolt in the embodiment shown, is threaded into bushing, or nut, 88 to put flanges 82 and 84 into compression at second joint 36. Compressor case 28 and combustor case 30 are thus rigidly supported within APU 10.

Forward support ring 40 extends radially from second joint 36. Forward support ring 40 comprises an annular disk having an inner diameter end and an outer diameter end. Forward support ring 40 includes a bore at its inner diameter end through which fastener 86 extends. The outer diameter end of forward support ring 40 is joined with slot 76. Slot 76 extends axially from an aft facing surface of forward support ring 40. Slot 76 comprises an upper wall and a lower wall that form a three-hundred-sixty degree slot around forward support ring 40. The forward ends of the upper and lower walls are bent radially inward such that slot 76 can be welded, or otherwise fastened, to forward support ring 40 at joint 89. The aft ends of the upper and lower walls are flared away from each other to form a funneled, or conical, inlet that facilitates reception of flange 78 of fire enclosure 12. Flange 78 includes pad 80, which may be a ring of plastic or silicone, that facilitates sliding of flange 78 into slot 76. Slot 76 slightly deflects to accept flange 78 such that a tight seal is formed at fourth joint 42. Pad 80 also assists in forming an air-tight seal. Fourth joint 42 comprises a bird-mouth type or tongue and groove type seal.

Fourth joint 42 allows forward support ring 40 to be axially displaced from fire enclosure 12 as, for example, combustor case 30 grows in axial length from thermal expansion. The length of slot 76 is sized to produce a flame-quenching or flame-arresting channel. For example, the length of the horizontal portions of the walls of slot 76 between the forward bent ends and the aft flared ends is approximately seven times the space between the upper and lower walls when flange 78 and pad 80 are inserted into slot 76. Such a configuration ensures that any flames entering slot 76 from within enclosure 12 are smothered or extinguished before being able to escape slot 76 outside of enclosure 12. Second joint 36 comprises a metal-to-metal seal such that flame is also prevented from passing through second joint 36. As such, fire enclosure 12 and forward support ring 40 maintain a fire safe enclosure around the hot zone of APU 10, while also allowing fire enclosure 12 to be axially displaced within APU 10.

FIG. 3 shows fifth joint 46 of FIG. 1 comprising a radial expansion joint. Fifth joint 46 includes pin 90, first bore 92, second bore 94, first bushing 96 and second bushing 98. Fifth joint 46 connects fire enclosure 12 (FIG. 1) to exhaust case 32 using aft support ring 44. Exhaust case 32 and aft support ring 44 include radially opposed, generally horizontal portions that provide concentric surfaces suitable for joining with pin 90. Aft support ring 44 includes first bore 94, which aligns radially with second bore 96 in exhaust case 32. Second bore 94 includes second bushing 98, which comprises a boss that is welded, brazed or otherwise joined to exhaust case 32. First bushing 96 is positioned around pin 90, which is subsequently positioned through first bore 92 and into second bushing 98. The outer diameter of bushing 96 is larger than the diameter of bore 92 such that bushing 96 does not pass through bore 92. Flange 99 on pin 90 has an outer diameter larger than the inner diameter of bushing 96 to prevent pin 90 from passing through first bushing 96. The inner diameter bore of bushing 96 is slightly larger than the outer diameter of pin 90 such that a friction fit is produced. Likewise, the inner diameter bore of bushing 98 is slightly larger than the outer diameter of pin 90 such that a friction fit is produced. Thus, when assembled, pin 90 is prevented from separating from fifth joint 46 by tight coupling with bushing 96 and bushing 98, and bushing 96 is pinned to aft support ring 44 by flange 99. Pin 90 is permitted to slide within bushing 98 to accommodate radial displacement of exhaust case 32 with respect to aft support ring 44. Fifth joint 46 comprises a plurality of sliding pin connections displaced around the circumference of aft support ring 44. In one embodiment, three sliding pin connections are disposed one-hundred-twenty degrees apart along aft support ring 44.

Bushing 98 and pin 90 form a metal-to-metal contact that prevents flame from exhaust case 32 from passing through. In the embodiment shown, pin 90 comprises a hollow member having an internal passageway that connects atmospheric conditions outside fire enclosure 12 with the interior of exhaust case 32. In various embodiments of the invention, pin 90 may comprise a solid body to prevent flames from passing through fifth joint 46. As such, fire enclosure 12 and aft support ring 44 maintain a fire safe enclosure around the hot zone of APU 10, while also allowing fire enclosure 12 to be radially displaced within APU 10.

As discussed, fire enclosure 12 produces a flame-proof enclosure surrounding the hot zone of APU 10. The axial expansion joint of fourth joint 42 and the radial expansion joint of fifth joint 46 permit fire enclosure to deflect and change position within APU 10, reducing stresses incurred during operation of APU 10. Expansion joints 42 and 46 maintain the flame-proof qualities of fire enclosure 12 by providing flame-quenching joints or flame-proof joints that prevent flames from escaping enclosure 12. Expansion joints 42 and 46 allow fire enclosure 12 to be mounted in close proximity to APU 10, thereby reducing the footprint of fire enclosure 12. Smaller fire enclosures have the advantage of directly being lighter and cheaper. However, the small size of fire enclosure 12 also reduces the size, weight and expense of fire extinguishing equipment, such as Halon bottles and spraying systems, that is typically included within fire enclosures to ultimately eliminate fire hazards should they arise.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
an auxiliary power unit comprising:
   a turbine;
   a compressor;
   a shaft supporting the turbine and the compressor;
   a combustor section including:
      an inlet for receiving compressed air from the compressor; and
      an outlet for discharging gas to the turbine;
an engine case circumscribing the turbine and the compressor, the engine case comprising a compressor section and a turbine section;
an exhaust case including:
   an inlet connected to an outlet of the turbine section at a first joint; and
   an outlet for discharging exhaust from the auxiliary power unit; and
a combustor case including:
   a first end connected to an outlet of the compressor section at a second joint; and
   a second end connected to the exhaust case at a third joint;
wherein the engine case, the compressor section of the engine case, the combustor case, the turbine section of the engine case and the exhaust case form a serpentine flow path; and
a fire enclosure including:
   a first end joined to the auxiliary power unit by a fourth joint, the fourth joint comprising an expansion joint; and
   a second end joined to the auxiliary power unit by a fifth joint, the fifth joint comprising an expansion joint.

2. The system of claim 1 wherein:
the fourth joint comprises an axial expansion joint connected to the second joint and that permits axial movement between the fire enclosure and the engine case, but restricts radial movement; and
the fifth joint comprises a radial expansion joint connected to the outlet of the exhaust case and that permits radial movement between the fire enclosure and the exhaust case, but restricts axial movement.

3. The system of claim 2 wherein the fire enclosure further comprises:
an aft support ring including:
   a first end joined to the fire enclosure; and
   a second end joined to the outlet of the exhaust case through the radial expansion joint.

4. The system of claim 3 wherein the radial expansion joint comprises:
a first receiving bore extending through the aft support ring;
a second receiving bore extending through the exhaust case; and
a pin extending through the first and second receiving bores such that radial relative movement between the exhaust case and the aft support ring is permitted and axial relative movement is inhibited.

5. The system of claim 2 and further comprising:
a forward support ring connecting the second joint to the axial expansion joint.

6. The system of claim 5 wherein the axial expansion joint comprises:
an axial flange extending from the first end of the fire enclosure; and
an axial slot extending from the forward support ring.

7. The system of claim 5 wherein the spacing between the axial flange and the axial slot of the axial expansion joint is sized to form a flame arrestor.

8. The system of claim 5 wherein:
the axial expansion joint extends three-hundred-sixty degrees around the inlet of the fire enclosure; and
the radial expansion joint comprises a series of three pins spaced one-hundred twenty degrees apart around the aft support ring.

9. The system of claim 2 wherein the fire enclosure includes:
an eductor inlet; and
an E-seal surrounding the eductor inlet;
wherein the eductor inlet is configured to direct ambient air into the fire enclosure to cool the combustor case.

10. The system of claim 2 wherein the fire enclosure is comprised of a composite material.

11. The system of claim 2 wherein the second joint and the third joint comprise rigid connections that restrain axial and radial movement.

12. The system of claim 1 wherein:
the first end of the fire enclosure is joined to the compressor case aft of the compressor by the fourth joint; and
the second end of the fire enclosure is joined to the exhaust case aft of the combustor by the fifth joint.

13. An auxiliary power unit comprising:
a gas turbine engine comprising:
   a turbine;
   a compressor;
   a shaft supporting the turbine and the compressor;
   a combustor section including:
      an inlet for receiving compressed air from the compressor; and
      an outlet for discharging gas to the turbine; and
   an engine case circumscribing the turbine and the compressor, the engine case comprising a compressor section and a turbine section;
an exhaust case including:
   an inlet connected to an outlet of the turbine section at a first joint; and
   an outlet for discharging exhaust from the gas turbine engine;
a combustor case including:
   a first end connected to an outlet of the compressor section at a second joint; and
   a second end connected to the exhaust case at a third joint; and
a fire enclosure including:
   a first end joined to the auxiliary power unit by a fourth joint, the fourth joint comprising an axial expansion joint connected to the second joint and that permits axial movement between the fire enclosure and the engine case, but restricts radial movement;
   a second end joined to the auxiliary power unit by a fifth joint, the fifth joint comprising a radial expansion joint connected to the outlet of the exhaust case and that permits radial movement between the fire enclosure and the exhaust case, but restricts axial movement; and an aft support ring including:
   a first end joined to the fire enclosure; and
   a second end joined to the outlet of the exhaust case through the radial expansion joint;
wherein the radial expansion joint comprises:
   a first receiving bore extending through the aft support ring;
   a second receiving bore extending through the exhaust case; and
   a pin extending through the first and second receiving bores such that radial relative movement between the exhaust case and the aft support ring is permitted and axial relative movement is inhibited.

14. An auxiliary power unit comprising:
a gas turbine engine comprising:
   a turbine;
   a compressor;
   a shaft supporting the turbine and the compressor;
   a combustor section including:
      an inlet for receiving compressed air from the compressor; and
      an outlet for discharging gas to the turbine; and
   an engine case circumscribing the turbine and the compressor, the engine case comprising a compressor section and a turbine section;
   an exhaust case including:
      an inlet connected to an outlet of the turbine section at a first joint; and
      an outlet for discharging exhaust from the gas turbine engine;
   a combustor case including:
      a first end connected to an outlet of the compressor section at a second joint; and
      a second end connected to the exhaust case at a third joint; and
   a fire enclosure including:
      a first end joined to the auxiliary power unit by a fourth joint, the fourth joint comprising an axial expansion joint connected to the second joint and that permits axial movement between the fire enclosure and the engine case, but restricts radial movement;
      a second end joined to the auxiliary power unit by a fifth joint, the fifth joint comprising a radial expansion joint connected to the outlet of the exhaust case and that permits radial movement between the fire enclosure and the exhaust case, but restricts axial movement;
an eductor inlet; and
an E-seal surrounding the eductor inlet;
wherein the eductor inlet is configured to direct ambient air into the fire enclosure to cool the combustor case.

\* \* \* \* \*